United States Patent
Correll et al.

(10) Patent No.: US 6,554,170 B1
(45) Date of Patent: Apr. 29, 2003

(54) BOAT ACCESSORY RACK

(75) Inventors: Richard C. Correll, Murfreesboro, TN (US); Darryl Todd Box, Mount Juliet, TN (US)

(73) Assignee: Marine Accessories Corporation, Sarasota, FL (US)

( * ) Notice: Subject to any disclaimer, the term of this patent is extended or adjusted under 35 U.S.C. 154(b) by 0 days.

(21) Appl. No.: 09/881,329

(22) Filed: Jun. 13, 2001

(51) Int. Cl.[7] .................................................. B60R 9/00
(52) U.S. Cl. ........................ 224/406; 141/343; 141/361; 224/404; 224/405; 224/545; 224/551
(58) Field of Search ................................ 224/406, 404, 224/405, 551, 545, 558; 114/343, 64, 361; 211/175, 182, 184

(56) References Cited

U.S. PATENT DOCUMENTS

| | | | |
|---|---|---|---|
| 2,829,660 A | 4/1958 | Wester et al. | |
| 3,165,111 A | 1/1965 | Foster | |
| 3,776,437 A | * 12/1973 | Carney | 211/70.5 |
| 3,925,836 A | * 12/1975 | Simmonds | 114/254 |
| 3,949,698 A | 4/1976 | Sell | |
| 4,234,112 A | 11/1980 | Gallant | |
| 4,483,683 A | 11/1984 | Alley, Sr. | |
| 4,582,015 A | 4/1986 | Hunter | |
| 5,105,754 A | 4/1992 | Collins | |
| 5,280,270 A | 1/1994 | Correa et al. | |
| 5,381,141 A | 1/1995 | Stahl | |
| 5,439,152 A | * 8/1995 | Campbell | 108/55.1 |
| 5,520,118 A | * 5/1996 | McCarthy | 108/152 |
| 5,520,139 A | 5/1996 | King et al. | |
| 5,520,316 A | * 5/1996 | Chen | 211/12 |
| 5,669,325 A | 9/1997 | Feikema | |
| D409,972 S | 5/1999 | Todd | |
| 5,901,890 A | * 5/1999 | Stokes | 114/343 |
| 5,979,350 A | 11/1999 | Larson et al. | |
| 6,123,208 A | * 9/2000 | Haenszel | 108/55.1 |
| 6,327,993 B1 | 12/2001 | Richens, Jr. | |
| 6,349,666 B1 | 2/2002 | Hastings | |

* cited by examiner

*Primary Examiner*—Stephen K. Cronin
*Assistant Examiner*—Maerena W. Brevard
(74) *Attorney, Agent, or Firm*—Michael A. Carrillo; Robert E. Browne

(57) ABSTRACT

A universal boat accessory rack that provides a first support, a second support, a cross-bar connecting the first support to the second support, and a plurality of fasteners, which connect the first support and second support to a boat hull. More specifically, the first support, the second support and the cross-bar are all adjustable in length. Therefore, the boat accessory rack has an adjustable height, width and depth. In addition, the fasteners are capable of being attached in a vertical, horizontal or angular position with respect to the boat hull. In this manner, a boat owner may quickly and easily install the boat accessory rack on boats embodying a number of different sizes and designs.

36 Claims, 8 Drawing Sheets

BOAT ACCESSORY RACK

BACKGROUND OF THE INVENTION

The present invention relates generally to a boat accessory rack and, more particularly, to an adjustable boat accessory rack that may be attached to a variety of different boats.

Since small boats are used to tow water skiers, a common problem for such boat owners is that there is not enough room within the boat hull for the water skiers and their accompanying ski accessories. To solve this problem many boat owners have added ski racks to store these accessies, i.e., water skis, wake boards, and similar accessories. Examples of such boat accessory racks can be seen in U.S. Pat. No. 4,582,015 (the "'015 Patent), U.S. Pat. No. 5,105,754 (the "'754 Patent) and U.S. Pat. No. 5,979,350 (the "'350 Patent").

While these known boat accessory racks work for their intended purpose, there are drawbacks in their designs. For example, because known boat accessory racks, such as the rack disclosed in the '350 Patent, are constructed as a welded, generally unitary structures, boat accessory racks have to be custom designed for installation on particular boats. This often requires professional installation which is costly to the consumer. Furthermore, the large nature of these unitary structures eliminates the ability to ship boat accessory racks via common carrier, thus, further increasing the cost of such racks to consumers.

SUMMARY OF THE INVENTION

To overcome the disadvantages noted above, the present invention is directed to a universal boat accessory rack with a first support, a second support, a cross-bar connecting the first support to the second support, and a plurality of fasteners, which connect the first support and second support to a boat hull. More specifically, the first support, the second support and the cross-bar are all adjustable in length. Therefore, the boat accessory rack has an adjustable height, width and depth. In addition, the fasteners are capable of being attached in a vertical, horizontal or angular position with respect to the boat hull.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
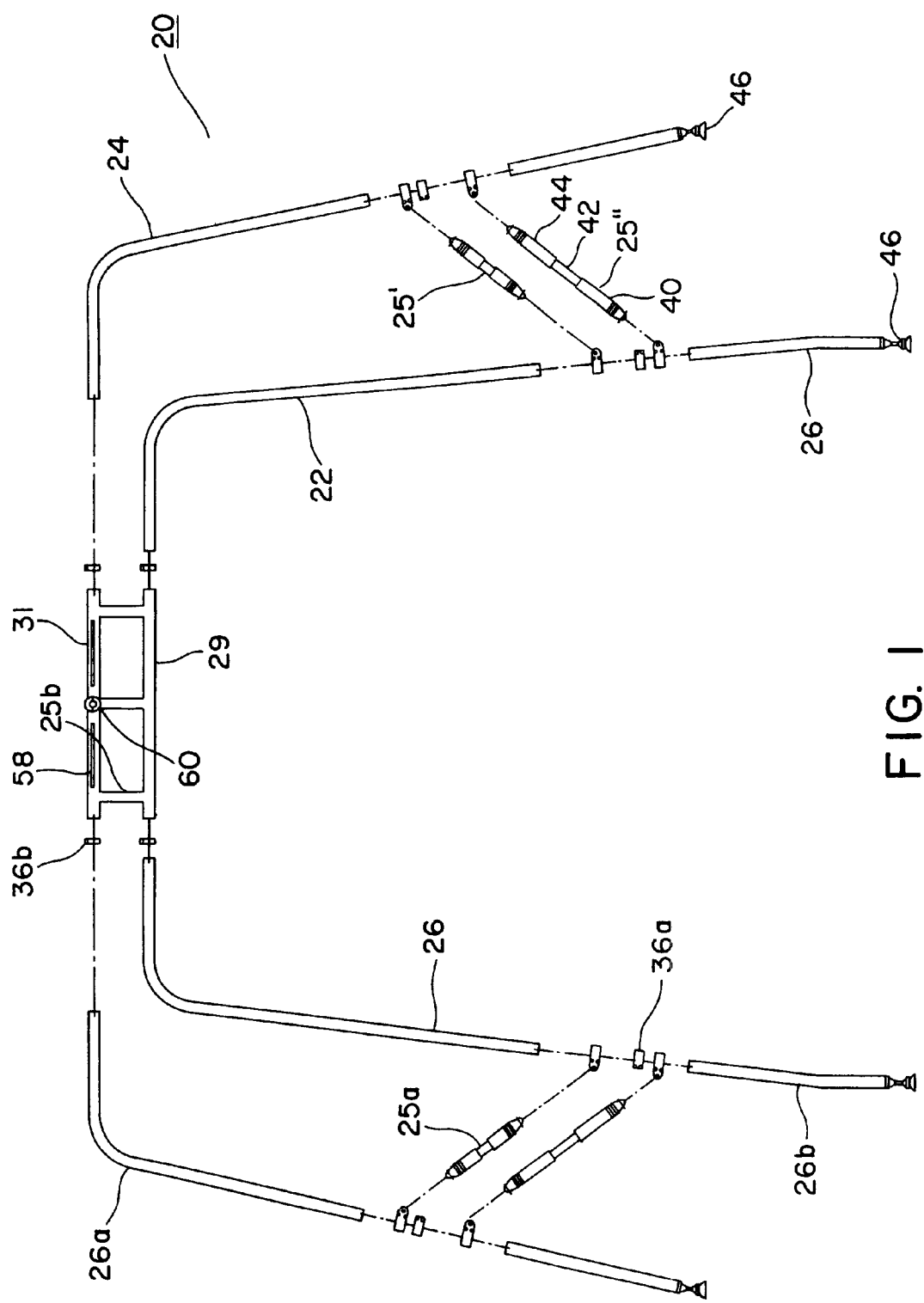
FIG. 1 shows an exploded view of an exemplary boat accessory rack.

Turning now to the figures, wherein like reference numerals refer to like elements, there is illustrated a boat accessory rack 20. The boat accessory rack 20 is particularly advantageous as it is adjustable, thereby allowing the rack 20 to be quickly and easily attached to boats of varying sizes. In particular, the boat accessory rack has an adjustable height, adjustable width, i.e., port to starboard, and adjustable depth, i.e., fore to aft, as well as a universal mounting assembly.

As shown in FIG. 1, the rack 20 may be comprised of a first support or front support 22, and a second support or rear support 24, the first support 22 being attached to the second support by one or more cross-bars 25. Each of the supports 22, 24 also include a first leg 26 and a second leg 26, which are attached by a center section 29 and 31, respectively.

Figure 2:
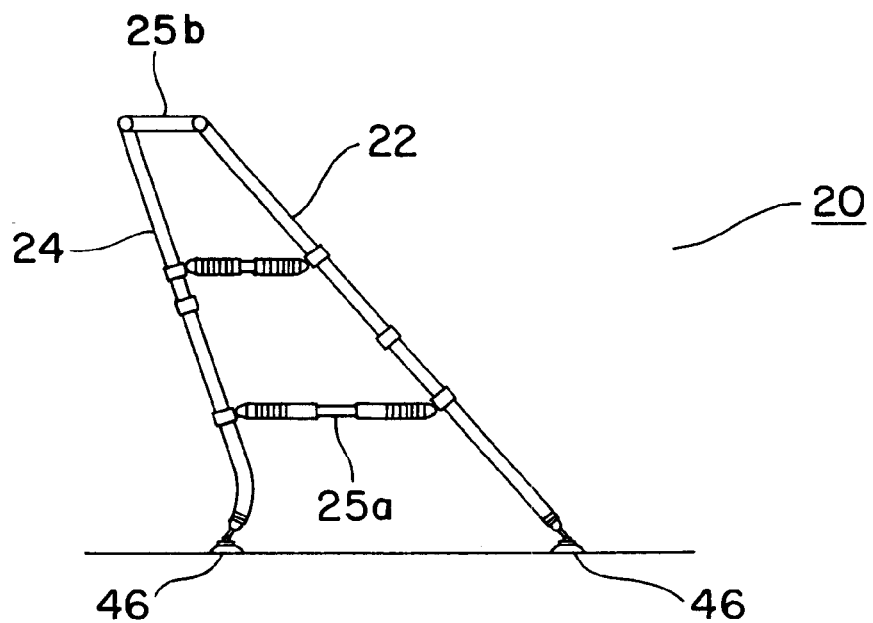
FIG. 2 shows a side view of the assembled boat accessory rack shown in FIG. 1.
Figure 3:
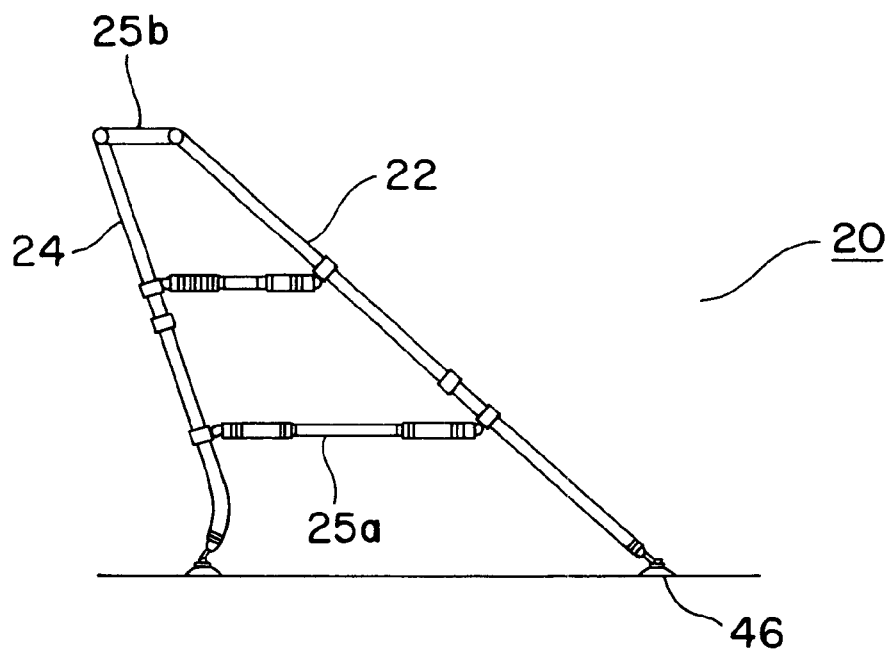
FIG. 3 shows a side view of the assembled boat accessory rack shown in FIG. 2 in an extended form.

For adjusting the support 22, 24 in a generally vertical direction in relation to the boat 34 and as shown in FIGS. 2 and 3, the legs are preferably telescoping in nature. Since each of the supports 22, 24 are preferably of a similar construction, the following description of the first leg 26 of the first support 22 is equally applicable to the remaining legs 26 on the supports 22, 24. The telescoping property of the first leg 26 may be achieved by constructing the first leg 26 with an upper leg 26a and a lower leg 26b, which is adapted to receive at least a portion of the upper leg 26a. To this end, the first leg 26 may be constructed from a substantially hollow tube, where the upper leg 26a preferably assumes a smaller diameter than the lower leg 26b. The difference in diameter between the upper leg 26a and the lower leg 26b allows a portion of upper leg 26a to fit within a portion of the lower leg 26b. Thus, the upper and lower legs 26a, 26b are in slidable engagement with one another. This allows users to alter the height of the rack 20 by varying the length of the legs 26 as needed. Although the upper leg 26a preferably fits within the lower leg 26b, it should also be apparent to those with skill in the art that the lower leg 26b could also be designed to fit within the upper leg 26a.

To fix the length of the first leg 26, a clamp 36 may be attached to the lower leg 26b near a point of intersection with the upper leg 26a. By tightening the clamp 36, the diameter of the lower leg 26b may be reduced, thereby causing a frictional engagement between the upper leg 26a and the lower leg 26b and preventing movement of the upper leg 26a with respect to the lower leg 26b. To further ease the amount of pressure needed to clamp the upper leg 26a and the lower leg 26b together, it should be understood by those with skill in the art that the lower leg 26b may include a slot 38, or similar opening, near the point of intersection with the upper leg 26a.

Figure 4:
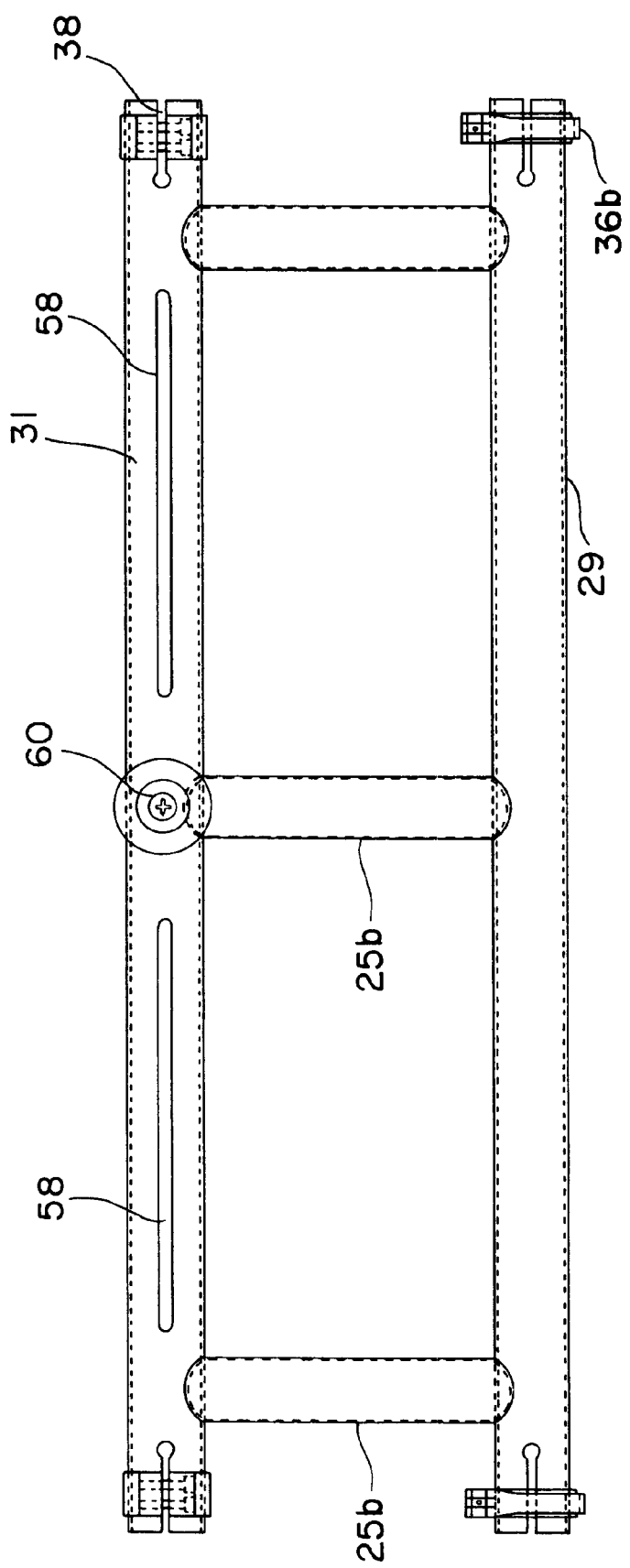
FIG. 4 shows a top view of exemplary center sections for slidably engaging first and second legs of the boat accessory rack shown in FIG. 1.

For adjusting the supports 22, 24 in a generally horizontal direction in relation to the boat 34 and as shown in FIG. 1 and FIG. 4, center sections 29 and 31, respectively, are used to telescoping connect the legs 26 of each support 22, 24. Again, since each of the supports 22 and 24 are preferably of a similar construction, the following description of the first leg 26 and center section 29 is equally applicable to the remaining legs 26 of the respective supports 22, 24 and the center sections 29 and 31. The telescoping property of the first leg 26 may be achieved by constructing the center section 29 with a hollowed portion into which the upper leg 26a is slidable. To this end, the upper leg 26a preferably assumes a smaller diameter than the diameter of the center section 29. The difference in diameter between the upper leg 26a and the center section 29 allows the upper leg 26a to fit within the hollowed portion of the center section 29. Thus, the upper leg 26a and the center section 29 are in slidable engagement with one another. This allows users to alter the width of the rack 20 by varying the width or distance between the first legs 26 and the second legs 26 as needed, while maintaining their connectivity. It should also be appreciated by those with skill in the art that the upper leg 26a may be of a larger diameter than the center section 29 such that the center section 29 can be slidably positioned within a hollowed portion of the upper leg 26a.

To fix the width of the first leg 26, a clamp 36 may be attached to the center section 29 of the first support 22 near a point of intersection with the upper leg 26a. By tightening the clamp 36, the diameter of the center section 29 may be reduced, thereby causing a frictional engagement between the upper leg 26a and the center section 29 and preventing movement of the upper leg 26a with respect to the center section. To further ease the amount of pressure needed to clamp the upper leg 26a and the center section 29 together, it should be understood by those with skill in the art that the center section may include a slot 38, or similar opening, near the point of intersection with the upper leg 26a.

Figure 5:
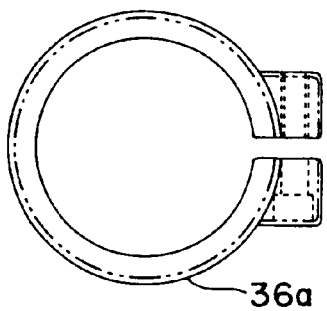
FIG. 5 shows a top view of an exemplary bolted clamp for fixing the length of one of the legs of the boat accessory rack shown in FIG. 1.
Figure 6:
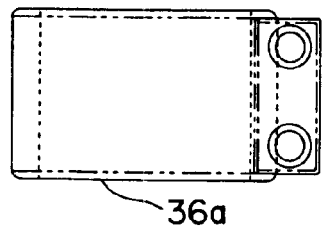
FIG. 6 shows a side view of the bolted clamp shown in FIG. 5.
Figure 7:
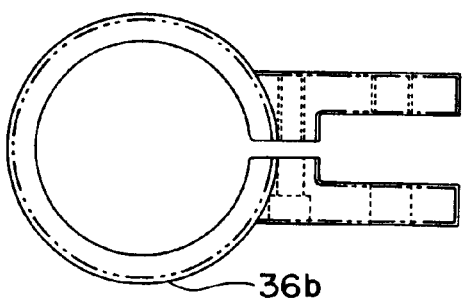
FIG. 7 shows a top view of an exemplary quick-release clamp for fixing the width of one of the legs of the boat accessory rack shown in FIG. 1.
Figure 8:
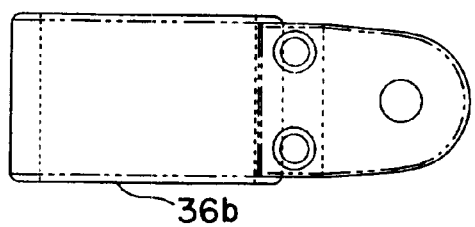
FIG. 8 shows a side view of the quick release clamp shown in FIG. 5.

The clamps 36 used in fixing the length or width of the legs 26 may be bolted clamps 36a or quick-release clamps 36b. As shown in FIGS. 5 and 6, and as is known in the art, bolted clamps 36a use threaded screws, or similar attachment members to tighten the clamp 36a. As shown in FIG. 7 and 8, and as is known in the art, quick-release clamps 36b use a lever and pin assembly. Although not required, it is preferred that bolted clamps 36a be used to fix the length of the legs 26 and quick-release clamps 36b be used to fix the width of the legs 26, but it should be appreciated by those with skill in the art that the bolted clamps 36a could be replaced with quick-release clamps 36b and vice versa.

For towing water skiers, inner-tubes and the like, the center section 29 of the first support 22 may preferably include a hitch 60. Although not required, the hitch preferably protrudes from the top of the center section 29 in a substantially vertical direction with respect to the boat. A tow rope may be attached to the hitch 60 at one end and the water skier on the other end, thereby allowing the boat accessory rack 20 to act as a ski tower. It should be understood by those with skill in the art that the hitch 60 could also be attached to the center section 31 of the second support 24 or to other parts of the boat accessory rack, and that the hitch could also protrude at an angle, or in a substantially horizontal direction, with respect to the boat.

For adjusting the spacing between the first legs 26 and the second legs, respectively, on the second support 24, one or more adjustable cross-bars 25a may be provided. Moreover, the present invention preferably includes a upper adjustable cross-bar 25a40 and a lower adjustable cross-bar 25a" for connecting the first legs 26 and the second legs 26.

In addition, fixed cross-bars 25b may be provided to attach the center section 29 of the first support 22 to the center section 29 of the second support 24; the fixed cross-bars 25b are preferably fixedly attached to the center section 29 and of a fixed length. It should also be understood, however, that in the alternative, the cross-bars 25 that attach the center section 29 of the supports 22, 24 may be adjustable in length.

As shown in FIGS. 11 through 16, to allow the adjustable cross-bars 25a to have a varying length, each of the adjustable cross bars 25a may include a first member 40, a second member or mid-section 42, and a third member 44. One end of the first member 40 may be releasably attached to the first leg 26 of the first support 22 and the other end of the first member 40 may be threadedly connected to the mid-section 42 of the adjustable cross bar 25a. Thus, when the first member is rotated in a first direction, the first member 40 moves toward the mid-section 42 and the distance therebetween becomes shorter. Similarly, one end of the third member 44 may be releasably attached to the first leg 26 of the second support structure 24 and the other end of the third member 44 may be threadedly connected to the mid-section 42 of the adjustable cross bar 25a. Therefore, as shown in FIGS. 11–16, when the third member is rotated in the first direction, the third member 44 also moves toward the mid-section and the distance therebetween becomes shorter. When the first member 42 and the third member 44 are rotated in a second direction, both members 42 and 44 move away from the mid-section 42 and the distance therebetween becomes greater. As exemplified above, since the members 40, 44 are both threadedly connected to the mid-section 42, the first member 40 and the third member 44 must each be rotated in the same direction in order to shorten or lengthen the respective distance between the members 40, 44 and the mid-section 42. Since each of the adjustable cross-bars 25a may be of a similar design, the foregoing description of an adjustable cross-bar should be viewed as an exemplary description for any of the adjustable cross-bars 25a.

Figure 9:
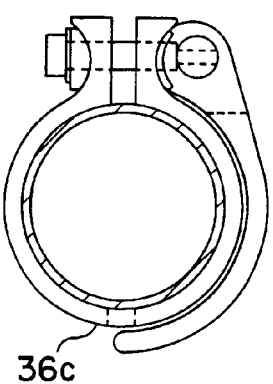
FIG. 9 shows a top view of an exemplary bolted clamp with a female u-joint for attaching a cross bar to one of the legs of the boat accessory rack shown in FIG. 1.
Figure 10:
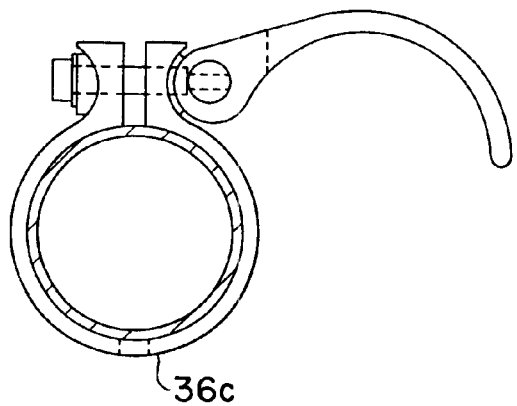
FIG. 10 shows a side view of the bolted clamp with the female u-joint shown in FIG. 9.
Figure 11:
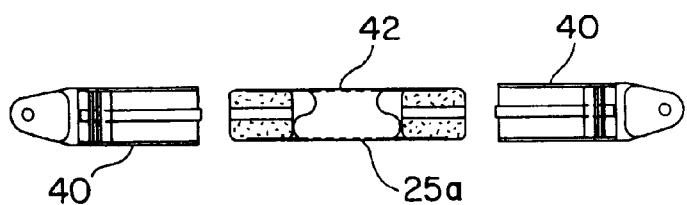
FIG. 11 shows an exploded view of an upper cross-bar for connecting first support legs to second support legs of the boat accessory rack shown in FIG. 1.
Figure 12:
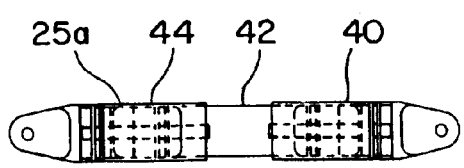
FIG. 12 shows a side view of the upper cross-bar shown in FIG. 11 in a compact position.
Figure 13:
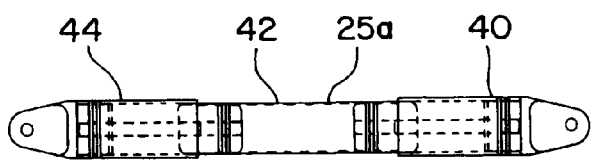
FIG. 13 shows a side view of the upper cross-bar shown in FIG. 11 in an expanded position.
Figure 14:
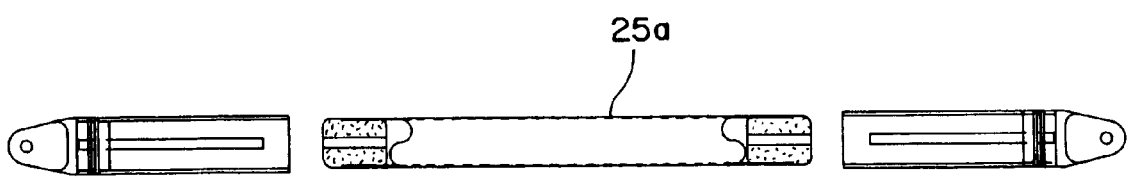
FIG. 14 shows an exploded view of a lower cross-bar for connecting the first support legs to the second support legs of the boat accessory rack shown in FIG. 1.
Figure 15:
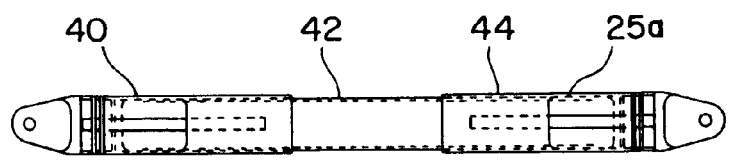
FIG. 15 shows a side view of the lower cross-bar shown in FIG. 14 in a compact position.
Figure 16:
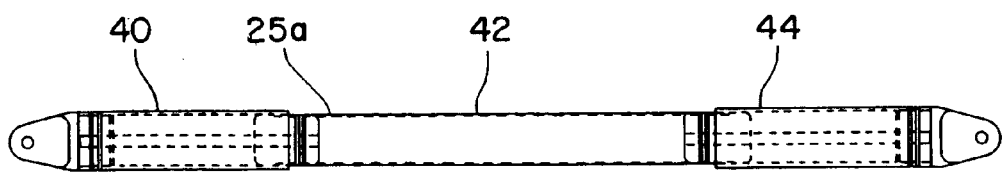
FIG. 16 shows a side view of the lower cross-bar shown in FIG. 14 in an expanded position.

For attaching the first members 40 and the third members 42 to the legs 26, each of the members 40 and 42 include a clamp 36c which slidably engages the legs 26. Although not required, the clamp 36c is preferably a bolted clamp. Moreover, as shown in FIGS. 9 and 10, the clamp 36c also includes a female u-joint 56 for pivotally attaching the members 40 and 42 to the clamp 36c. Since the clamp 36c is in slidable engagement with the legs 26, it should be appreciated by those with skill in the art that the clamp 36c may be attached at any point on the legs 26. It should also be appreciated by those with skill in the art that a quick-release clamp with a female u-joint could also be used to attach the members 40 and 42 to the legs 26.

Figure 17:
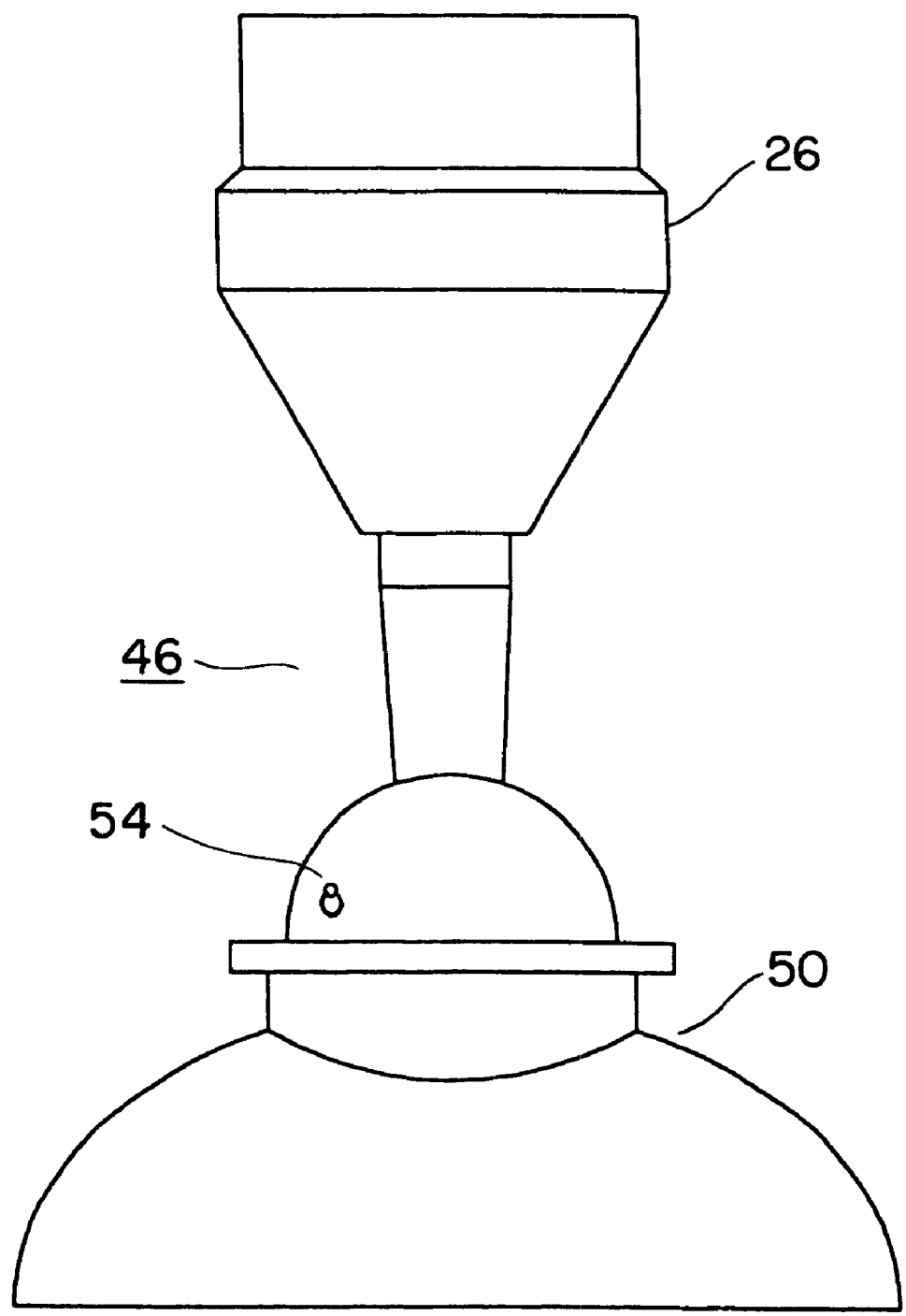
FIG. 17 shows a front view of an exemplary fastener for attaching the legs of the boat accessory rack shown in FIG. 1 to a boat hull.
Figure 18:
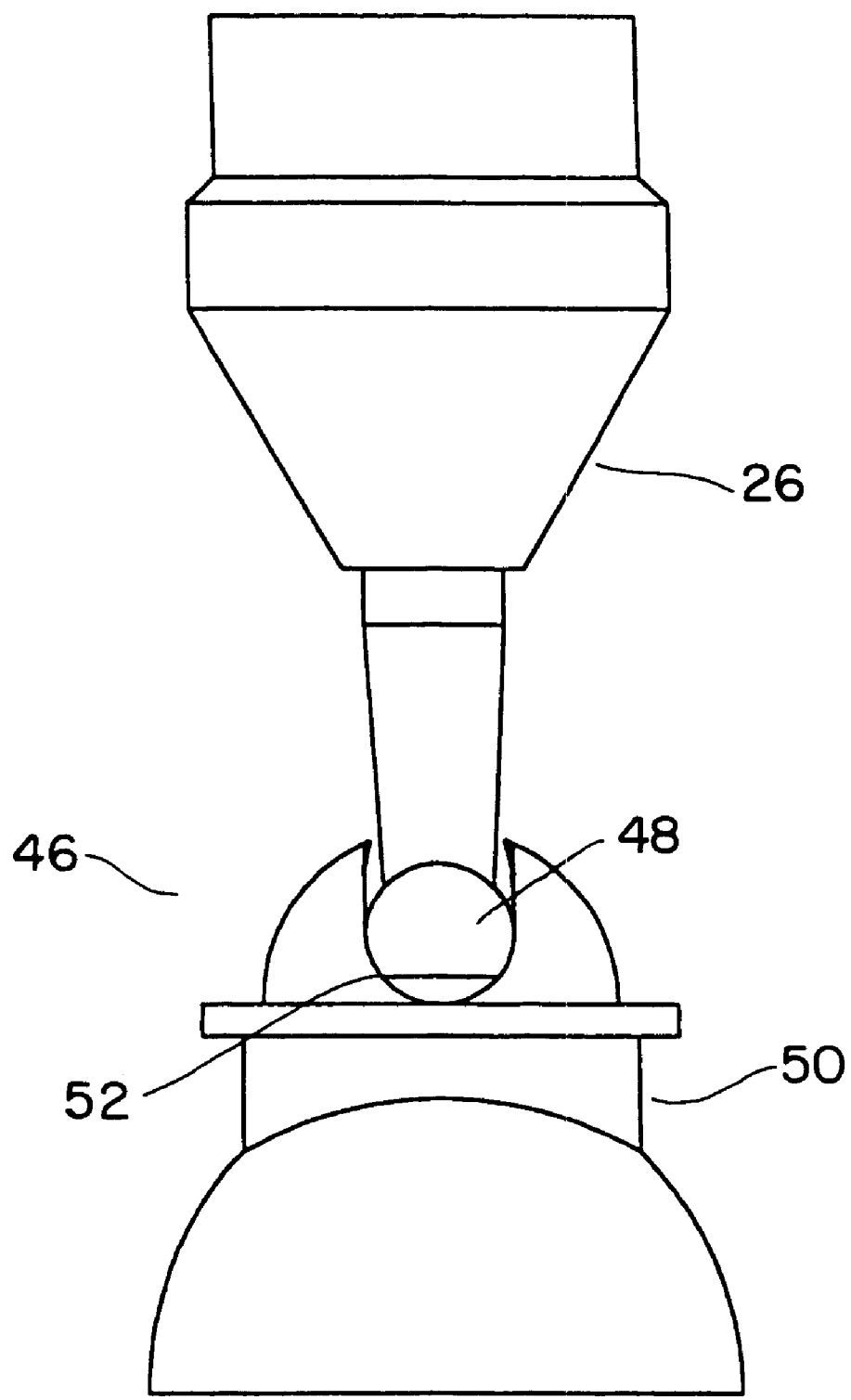
FIG. 18 shows a side view of the fastener shown in FIG. 17.
Figure 19:
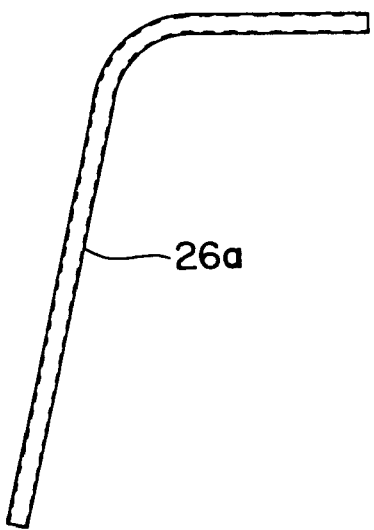
FIG. 19 shows an upper leg with a snap button for setting the legs and the first support to a predetermined angular relation.
Figure 20:
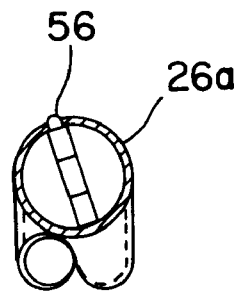
FIG. 20 shows a section view of the upper leg and snap button shown in FIG. 19 along line A—A.

As shown in FIG. 1, for attaching the legs 26 of the supports 22, 24 to the boat, a plurality of fasteners 46 are provided. As shown in greater detail in FIGS. 1, 17 and 18, each of the fasteners 46 are comprised of a ball joint 48 and a mount 50, the ball joint 48 connecting one of the legs 26 to the mount 50 and the mount 50 being attached to the boat. As shown in FIG. 18, to attach the ball joint 48 to the mount 50, the mount 50 may include a groove 52 with one unobstructed side for receiving the ball joint 48. Further, assuming that the groove 52 extends horizontally, the ball joint is generally unable to move up or down in a vertical direction. Therefore, as shown in FIG. 17, once the ball joint 48 is seated in the groove 52, a pin 54 may be inserted into an aperture 56, which extends through the side walls of the mount 50, thereby causing the pin 54 to lock the ball joint 48 within the mount 50.

While not required, it is preferred that the ball joint be removable from the mount. This is important for assisting in the installation of the rack 20 and for storing the rack. More specifically, by removing the pin 54 and sliding the ball joint 48 out from within the groove, the ball joint 48 can be readily removed from the mount, thereby detaching the legs 26 from the boat hull.

It should be apparent to those with skill in the art that, although the ball joint 48 is locked within the mount 50, the ball joint may be rotated a full 360 degrees with respect to the mount 50 and the first leg 26 is also pivotable by up to 180 degrees with respect to the mount 50. The rotatability of the ball joint 48 with respect to the mount 50 and the pivotability of the first leg 26 with respect to the mount 50 allow the mount to be secured in nearly any position with regard to the hull of the boat, including at an angle, in a vertical position or in a horizontal position with respect to the boat.

As shown in FIGS. 1, 4, 20 and 21, to ensure the proper angular orientation of the boat accessory rack during installation of the rack 20, the upper leg of the first leg 26 and the second leg 26 of the second support 24 may include a spring-loaded, snap button 56 and the center section 31 of the second support 24 may include a slot 58 for receiving the spring-loaded, snap button 56, thereby releasably fixing the rotation of the legs 26 of the second support 24 with respect to the center section 31 of the second support 24. Thus, in a manner that should be evident to those with skill in the art, by strategically placing the slot 58 and the spring-loaded, snap button 56, the legs 26 may be preset to assume a specific angular relation with respect to the boat. The preferred angular presetting is 18 degrees from vertical, however, it should be understood that this presetting may assume a varying angular relation with respect to the boat. It should also be apparent to those with skill in the art that the snap button 56 and the slot 58 could be located on the center section 29 of the first support 22. It should also be apparent to those with skill in the art that the legs 26 may also be rotatably adjustable with respect to the center sections 29 and 31 of the supports 22 and 24, respectively.

By attaching the supports 22, 24 to the boat in the described manner, the rack 20 may be installed quickly and easily, and may be adjusted to fit boats of varying sizes and designs.

While specific embodiments of the present invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof. It should also be understood that all patents discussed in this document are to be incorporated herein by reference in their entirety.

What is claimed is:

1. A boat accessory rack, comprising:
   a first support of adjustable height;
   a second support of adjustable height;
   a cross-bar of adjustable length connecting the first support to the second support whereby the spacing between the first support and the second support is adjustable;
   wherein the crossbar comprises a first member connected to the first support and a second member connected to the second support, wherein the first member and second member are adjustably coupled; a third member threadably engaged with the first and second members; and
   a plurality of fasteners for connecting the first support and the second support to a boat hull.

2. The boat accessory rack as recited in claim 1, where the fasteners are adapted to releasably attach the first support and the second support to the boat hull.

3. The boat accessory rack as recited in claim 1, wherein the first support comprises a generally vertically orientable, telescoping first leg and a generally vertically orientable, telescoping second leg.

4. The boat accessory rack as recited in claim 3, wherein the first support member comprises a generally horizontally oriented center section that telescopingly connects the first leg with the second leg.

5. The boat accessory rack as recited in claim 1, wherein the first member is adapted to connect with the first support at a plurality of different locations along the length of one of the legs on the first support and wherein the second member is adapted to connect with the second support at a plurality of different locations along the length of the respective leg on the second support.

6. The boat accessory rack as recited in claim 5, wherein the first member comprises a first clamp which is slidably attachable to one of the legs on the first support and the second member comprises a second clamp which is slidably attachable to the respective leg on the second support.

7. The boat accessory rack as recited in claim 1, wherein the first member is rotatable with respect to the first support and wherein the second member is rotatable with respect to the second support.

8. The boat accessory rack as recited in claim 1, wherein the second support further comprises a hitch to which a ski rope is attachable.

9. A boat accessory rack, comprising:
   a first support of adjustable height;
   a second support of adjustable height;
   a cross-bar of adjustable length connecting the first support to the second support whereby the spacing between the first support and the second support is adjustable; and
   a plurality of fasteners for connecting the first support and the second support to a boat hull;

wherein the first support includes a telescoping first leg, a telescoping second leg and a first center section telescopingly linking the first leg to the second leg, the second support includes a telescoping third leg, a telescoping fourth leg and a second center section telescopingly linking the third leg to the fourth leg and wherein the first center section is fixedly connect to the second center section.

10. The boat accessory rack as recited in claim 9, further comprising a plurality of cross-links that are welded to the first center section and the second center section.

11. The boat accessory rack as recited in claim 10, further comprising a plurality of quick-release clamps for use in connecting the first leg and the second leg to the first center section and the third leg and the fourth leg to the second center section.

12. A boat, comprised of:
a boat hull;
a boat accessory rack having a plurality of legs; and
a plurality of fasteners comprising a ball joint attachable to a respective one of the plurality of legs and a mount attachable to the boat hull, wherein while maintaining connectivity to the legs, the ball joint and the mount, the ball joint is capable of being rotated approximately 360 degrees with respect to the mount and the legs are capable of being pivoted approximately 180 degrees with respect to the mount.

13. A boat accessory rack, comprising:
a plurality of legs; and
a plurality of fasteners comprising a ball joint attachable to a respective one of the plurality of legs and a mount attachable to a boat hull wherein the ball joint is capable of being rotated approximately 360 degrees with respect to the mount and the legs are capable of being pivoted approximately 180 degrees with respect to the mount.

14. The boat as defined in claim 13, wherein the mount is releasably attachable to the boat hull.

15. A boat accessory rack, comprising:
a first support having an adjustable orientation with respect to vertical;
a second support having an adjustable orientation with respect to vertical;
a cross-bar connecting the first support to the second support;
a plurality of fasteners for connecting the first support and the second support to a boat hull; and
an angular orientation guide associated with the first support that indicates when the first support is oriented at a predetermined angle with respect to vertical.

16. The boat accessory rack as recited in claim 15, wherein the predetermined angle is approximately eighteen degrees from vertical.

17. The boat accessory rack as recited in claim 15, wherein the first support comprises a leg and a center section that is rotatably attached to the leg and the angular orientation guide comprises a cooperating slot and snap button, the cooperating slot and the snap button each being associated with one of the legs and the respective center section, wherein the slot and the snap button become engaged when the first support is oriented at the predetermined angle.

18. A boat accessory rack, comprising;
a first support having a first leg, a second leg and a first center section releasably connecting the first leg to the second leg;
a second support having a third leg, a fourth leg and a second center section releasably connecting the third leg to the fourth leg;
a cross-bar releasably attaching the first support to the second support; and
a plurality of fasteners for connecting the first support and the second support to a boat hull;
wherein the first leg and the second leg each comprise a lower leg connectable to a respective one of the plurality of fasteners and an upper leg releasably connected with the first center section and wherein the lower leg is in releasable, telescopic engagement with the upper leg.

19. The boat accessory rack as recited in claim 18, wherein the first center section and the second center section are welded together to form a unitary structure.

20. A boat accessory rack, comprising;
a first support having a first leg, a second leg and a first center section releasably connecting the first leg to the second leg;
a second support having a third leg, a fourth leg and a second center section releasably connecting the third leg to the fourth leg;
a cross-bar releasably attaching the first support to the second support; and
a plurality of fasteners for connecting the first support and the second support to a boat hull;
wherein the third leg and the fourth leg each comprise a lower leg connectable to a respective one of the plurality of fasteners and an upper leg releasably connected with the second center section and wherein the lower leg is in releasable telescopic engagement with the upper leg.

21. An accessory rack for a boat having a first side and a second side opposite the first side, comprising:
a first support of adjustable width having a first leg and a second leg;
a second support of adjustable width having a third leg and a fourth leg;
a plurality of fasteners for connecting the first leg and the third leg to the first side of the boat and the second leg and the fourth leg to the second side of the boat whereby the first support and the second support each span across a width of the boat defined between the first side of the boat and the second side of the boat; and
a cross-bar of adjustable length connecting the first support to the second support such that the spacing between the first support and the second support measured along a length of the boat is variable.

22. The accessory rack as recited in claim 21, wherein the first support has an adjustable height and the second support has an adjustable height.

23. The accessory rack as recited in claim 22, wherein the first support and the second support are generally U-shaped.

24. The accessory rack as recited in claim 22, wherein the fasteners are adapted to releasably attach the first, second, third, and fourth legs to the boat.

25. The accessory rack as recited in claim 22, wherein the first, second, third, and fourth legs each comprise a first member in telescoping engagement with a second member.

26. The accessory rack as recited in claim 22, wherein the cross-bar comprises a first member connected to the first support and a second member connected to the second support, the first member and the second member being adjustably coupled.

27. The accessory rack as recited in claim 26, wherein the first member is threadably coupled with the second member.

28. The accessory rack as recited in claim 26, wherein the first member comprises a first clamp that is slidably attached to the first support and the second member comprises a second clamp that is slidably attached to the second support.

29. A boat, comprising:
- a boat hull having a first side and a second side opposite the first side; and
- an accessory rack comprising:
  - a first support of adjustable width having a first leg and a second leg;
  - a second support of adjustable width having a third leg and a fourth leg;
  - a plural of fasteners for connecting the first leg and the third leg to the first side of the boat and the second leg and the fourth leg to the second side of the boat whereby the first support and the second support each span across a width of the boat defined between the first side of the boat and the second side of the boat; and
  - a cross-bar of adjustable length connecting the first support to the second support such that the spacing between the first support and the second support measured along a length of the boat is variable.

30. The boat as recited in claim 29, wherein the first support has an adjustable height and the second support has an adjustable height.

31. The boat as recited in claim 29, wherein the first support and the second support are generally U-shaped.

32. The boat as recited in claim 29, wherein the fasteners are adapted to releasably attach the first, second, third, and fourth legs to the boat.

33. The boat as recited in claim 29, wherein the first, second, third, and fourth legs each comprise a first member in telescoping engagement with a second member.

34. The boat as recited in claim 29, wherein the cross-bar comprises a first member connected to the first support and a second member connected to the second support, the first member and the second member being adjustably coupled.

35. The boat as recited in claim 34, wherein the first member is threadably coupled with the second member.

36. The boat as recited in claim 34, wherein the first member comprises a first clamp that is slidably attached to the first support and the second member comprises a second clamp that is slidably attached to the second support.

\* \* \* \* \*